US012397451B2

(12) United States Patent
Zhang et al.

(10) Patent No.: US 12,397,451 B2
(45) Date of Patent: Aug. 26, 2025

(54) SMALL ROBOT ARM JOINT, AND ROBOT USING SAME

(71) Applicant: REALMAN ROBOT CO., LTD., Beijing (CN)

(72) Inventors: Xulong Zhang, Beijing (CN); Xusheng Hao, Beijing (CN); Suibing Zheng, Beijing (CN)

(73) Assignee: REALMAN ROBOT CO., LTD., Beijing (CN)

( * ) Notice: Subject to any disclaimer, the term of this patent is extended or adjusted under 35 U.S.C. 154(b) by 0 days.

(21) Appl. No.: 18/838,871

(22) PCT Filed: Jun. 2, 2023

(86) PCT No.: PCT/CN2023/098093
§ 371 (c)(1),
(2) Date: Aug. 15, 2024

(87) PCT Pub. No.: WO2024/139056
PCT Pub. Date: Jul. 4, 2024

(65) Prior Publication Data
US 2025/0108521 A1    Apr. 3, 2025

(30) Foreign Application Priority Data
Dec. 26, 2022 (CN) .......................... 202211677443.5

(51) Int. Cl.
*B25J 9/10* (2006.01)
*B25J 9/12* (2006.01)
*B25J 17/00* (2006.01)

(52) U.S. Cl.
CPC ............. *B25J 17/00* (2013.01); *B25J 9/1025* (2013.01); *B25J 9/108* (2013.01); *B25J 9/126* (2013.01)

(58) Field of Classification Search
CPC . B25J 17/00; B25J 9/1025; B25J 9/108; B25J 9/126
See application file for complete search history.

(56) References Cited

U.S. PATENT DOCUMENTS

| | | | |
|---|---|---|---|
| 10,718,413 B2* | 7/2020 | Xiong | F16H 7/023 |
| 2013/0036851 A1* | 2/2013 | Kitahara | H01L 21/67766 901/23 |
| 2022/0314466 A1* | 10/2022 | Ai | F16H 49/001 |

FOREIGN PATENT DOCUMENTS

| CN | 102626930 B | * | 6/2014 |
|---|---|---|---|
| CN | 108422442 A | | 8/2018 |

(Continued)

OTHER PUBLICATIONS

International Search Report and Written Opinion for International Application No. PCT/CN2023/098093 dated Aug. 21, 2023.

*Primary Examiner* — Harry Y Oh
(74) *Attorney, Agent, or Firm* — Schmeiser, Olsen & Watts LLP

(57) ABSTRACT

A small-scale robotic arm joint and a robot thereof are provided. In the small-scale robotic arm, multiple bearings are arranged at both ends and middle of a motor shaft; a sliding seal member is provided between a harmonic reducer and a motor; seal members are fitted on contact surfaces between a circular spline and a housing, as well as between the circular spline and the output end; a control board and the output end are hollow structures, through which cables pass; a magnetic coder is adopted to reduce a volume of the joint; additionally, a magnetic shielding plate is provided on the housing that separates the motor and the control board. Robotic arms of a robot are connected using said small-scale robotic arm joints, which are compact, smooth-operating, (Continued)

and safe, improve stability of a rotational axis, and prevent lubricating grease from entering the motor interior or the control board.

9 Claims, 3 Drawing Sheets

(56) References Cited

FOREIGN PATENT DOCUMENTS

| | | | |
|---|---|---|---|
| CN | 111113480 A | 5/2020 | |
| CN | 211388854 U | 9/2020 | |
| CN | 111890410 A | 11/2020 | |
| CN | 111906815 A | 11/2020 | |
| CN | 217801789 U | 11/2022 | |
| CN | 115922773 A | 4/2023 | |
| JP | 2013099191 A | 5/2013 | |
| WO | WO-2023051714 A1 * | 4/2023 | ............ B25J 9/1025 |

* cited by examiner

SMALL ROBOT ARM JOINT, AND ROBOT USING SAME

CROSS REFERENCES TO RELATED APPLICATIONS

The present application is a U.S. national stage filing under 35 U.S.C. § 371 of International Application No. PCT/CN2023/098093 filed on Jun. 2, 2023, which claims priority to Chinese patent application No. 202211677443.5, filed on Dec. 26, 2022, both of which are incorporated herein by reference in their entireties.

TECHNICAL FIELD

The present invention relates to a field of robotics technology, and more specifically, to a small-scale robotic arm joint and a robot thereof.

BACKGROUND

A robotic arm joint unit includes a motor, a harmonic reducer, a unit housing, and an encoder, among other components. To ensure effective operation of the harmonic reducer, appropriate amount of lubricating grease needs to be added between a circular spline and a flex spline of the harmonic reducer. However, during operation of the joint unit, irrational structural design may cause grease to infiltrate into electrical components such as motor and coder, which seriously affects safety and reliability of the electrical components. Insufficient sealing may also result in grease flowing out of the housing, leading to waste of the grease and contamination of the robotic arm. In conventional designs, motor input shaft and housing fixed end support member are located at two positions, and the distance between the two positions is relatively close. However, the support member is relatively far from motor output end, which can easily result in instability of the motor input shaft. In addition, when designing wiring holes for a hollow structure, a typical design involves machining a large hole, through which power cables and signal cables are passed together, which can easily lead to interference with signal transmissions by the power cables.

Therefore, there is a need for a new joint structure to solve the above problems.

SUMMARY

In response to the necessity for a new joint structure to solve the above problems, the present invention provides a compact, smoothly operating, and safe small-scale robotic arm joint and robot thereof.

Specifically, the present invention provides a small-scale robotic arm joint that separates a motor, a harmonic reducer, and a control board into different spaces via a housing, which also comprises the following structures.

A motor shaft is coaxially connected to the housing via a bearing A and a bearing C; the harmonic reducer is separated from the motor via the housing and the bearing C, and a sliding seal member is provided in a gap between the separated housing and motor shaft. The sliding seal member comprises a sealing plastic and an O-ring. The O-ring is in contact with the housing, and the sealing plastic is in contact with a surface of the motor shaft; retaining rings are provided on both sides of the sealing plastic for axial positioning. A bearing B and a bearing D are provided between left and right ends of the motor shaft and the output end, wherein inner rings of the bearing B and the bearing D are fixed to the output end, and the outer rings thereof are fixed to a recessed surface of the motor shaft, and wherein a radial dimension of the recessed surface is greater than that of shaft hole surface of the motor shaft, allowing the inner rings of the bearing B and the bearing D to be substantially aligned with the shaft hole surface of the motor shaft.

A circular spline of the harmonic reducer is mechanically fixed to the output end, with outer diameter of the circular spline being a maximum outer diameter of the joint unit. Seal members are fitted on contact surfaces between the circular spline and the output end, as well as between the circular spline and the housing.

A rotor of the motor is connected to the motor shaft via a flat key, and a stator of the motor is fixed to the housing. The left end of the rotor of the motor is positioned by a shaft shoulder of the motor shaft on a side close to the harmonic reducer, and the right end is positioned axially by a spacer ring.

The control board is mechanically fixed to the housing, and both the control board and the output end have a hollow structure through which cables pass; the control board is fixed with two magnetic coders via electrical connection, and a magnetic disk corresponding to a coder sensor plate A is fixed to the motor shaft, while a magnetic ring corresponding to a coder sensor plate B is fixed to the shaft of the output end.

Two wiring holes are formed in the shaft of the output end, and power cables and signal cables of the joint unit are respectively threaded through one of the wiring holes.

A magnetic shielding plate is provided on the housing that separates the motor from the control board.

The bearing B and the bearing D are selected as deep groove ball bearings with double-sided seal rings.

A robot according to the present invention connects robot arms using the small-scale robotic arm joint.

The advantages and preferred effects of the present invention over the prior art are as follows.

(1) The robotic arm joint according to the present invention arranges two bearings B and D between left and right ends of the motor shaft and the output end and arranges two bearings A and C in the middle part of the motor shaft, effectively improving the smoothness of the rotating shaft by providing multiple support points. At the same time, by selecting deep groove ball bearings with double-sided seal rings for bearings B and D, it can also prevent the lubricating grease of the harmonic reducer from flowing into the control board on right side through the gap between the motor shaft and the output end, avoiding contamination of the control board by grease, which could cause short circuits and other issues.

(2) In the robotic arm joint of the present invention, a sliding seal member is arranged between the motor and the reducer, which can effectively prevent lubricating grease from entering the interior of the motor.

(3) In the robotic arm joint of the present invention, the maximum outer diameter of the circular spline equals to the maximum outer diameter of the joint unit, and there is no need to install a housing outside the circular spline. Through cooperation with the sealing, it can effectively prevent external contaminants from entering the interior of the reducer and also prevent internal lubricating grease from leaking out, causing waste and pollution of the grease.

(4) In the robotic arm joint of the present invention, the motor rotor is connected to the motor shaft using a flat key. The left end of the motor rotor is positioned by a shaft shoulder on the side close to the harmonic reducer side, and is axially positioned by a spacer ring on the side away from the harmonic reducer. The side face of the flat key is in a transitional fit with the mounting slot of the motor shaft and the mounting slot of the rotor. This connection is convenient for disassembly and assembly and ensures reliable installation.

(5) In one design of the present invention for bearings B and D, their outer rings are fixed to the recessed surface of the motor shaft. The radial dimension of the recessed surface is much greater than that of the shaft hole surface of the motor, ensuring that the installation of bearings B and D does not increase the radial dimension of the entire joint. This achieves a more compact structure for the entire joint compared to existing designs.

(6) In the present invention, a magnetic shielding plate is provided between the motor and the control board, and the motor shaft is made of non-magnetic aluminum alloy material. These two design solutions significantly reduce electromagnetic interference from the motor to the control board.

(7) Compared to the optical coders, the magnetic coder of the present invention has better resistance to interference and shock, and also reduces the overall structural volume of the joint unit.

(8) In the present invention, the output shaft is designed with a dual wiring holes structure, enabling separate routing of power cables and signal lines for the joint unit. This design can effectively avoid electromagnetic interference from the power cable to the signal cable.

Figure 1:
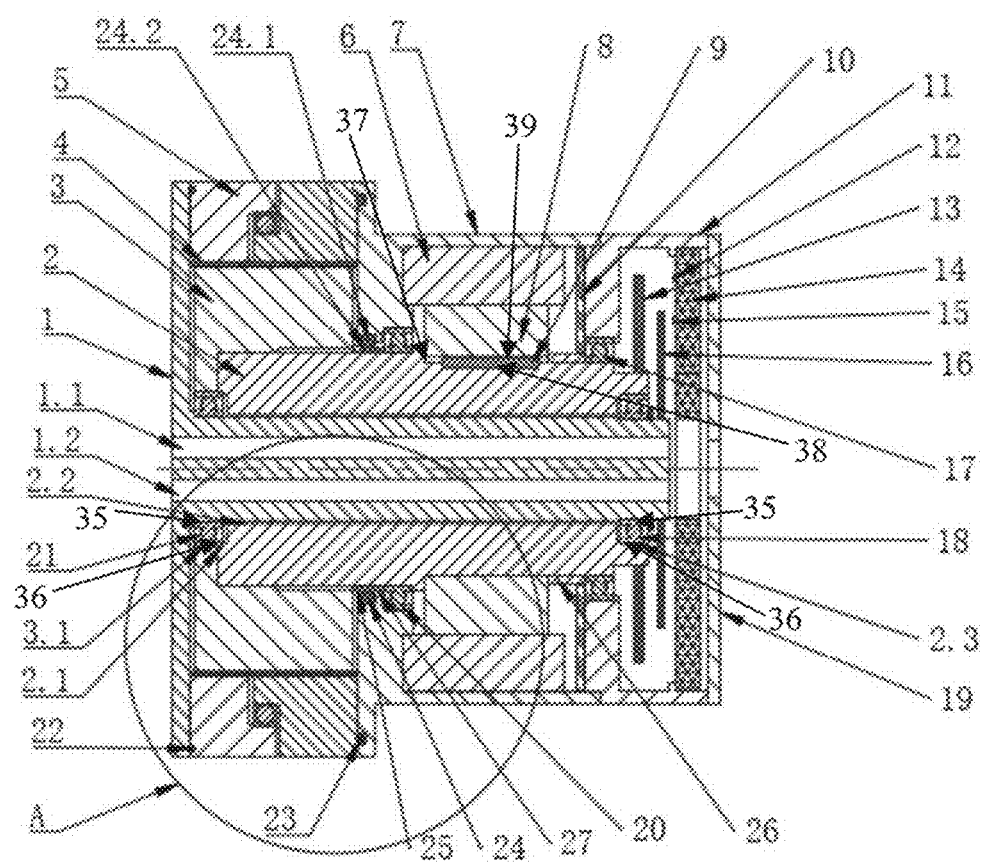
FIG. 1 is a schematic diagram of internal structure of a robotic arm joint according to the present invention.

Description of reference numerals: 1—output end; 1.1—wiring hole A; 1.2—wiring hole B; 2—motor shaft; 2.1—recessed surface A inside the motor shaft; 2.2—shaft hole surface of the motor shaft; 2.3—recessed surface B inside the motor shaft; 3—wave generator; 3.1—inner mounting surface; 4—flex spline; 5—circular spline; 6—motor stator; 7—housing A; 8—motor rotor; 9—flat key; 10—magnetic shielding plate; 11—housing B; 12—coder sensor plate A; 13—disk; 14—control board; 15—coder sensor plate B; 16—magnetic ring; 17—bearing A; 18—bearing B; 19—cover plate; 20—bearing C; 21—bearing D; 22—seal member A; 23—seal member B; 24—sliding seal member; 24.1—sealing plastic; 24.2—O-ring; 25—retaining ring A; 26—spacer ring; 27—retaining ring B; 28—joint unit; 29—robotic arm A; 30—robotic arm B; 31—robotic arm C; 32—robotic arm D; 33—robotic arm E; 34—robotic arm F; 35—inner ring; 36—outer ring; 37—shaft shoulder; 38—a mounting slot of the motor shaft; 39—a mounting slot of the rotor.

DETAILED DESCRIPTION

The present invention will be described below in further details with reference to the accompanying drawings and embodiments.

One object of the present invention is to provide a compact and smoothly operating small-scale robotic arm joint and a robot thereof.

As shown in FIG. 1, a structure of the robotic arm joint according to one embodiment of the present invention includes the following.

(1) Output end 1 has an axial structure coaxial with a motor shaft 2. Two wiring holes are opened in the shaft of the output end 1, namely wiring hole A1.1 and wiring hole B1.2. This wiring hole structure allows for separation threading of power cables and signal cables for the joint unit, effectively avoiding electromagnetic interference from power cables to signal cables.

(2) The reducer according to the present invention is a harmonic reducer, including a wave generator 3, a flex spline 4, and a circular spline 5. The flex spline 4 engages with the circular spline 5, achieving high transmission efficiency. In the present invention, the outer diameter of the circular spline 5 equals to the maximum outer diameter of the joint unit, eliminating the need for additional housing on the outside of the circular spline to be fixed to the robotic arm. The wave generator 3 serves as a torque input end, transmitting torque to the circular spline 5 through the flex spline 4. The circular spline 5 is mechanically fixed to the output end 1. In the present invention, on the contact surface between the circular spline 5 and the output end 1, and the contact surface between the circular spline 5 and the housing A7, effective prevention against entry of external impurities into interior of the reducer and leakage of internal lubricating grease can be achieved through cooperation with seal member A 22 and seal member B 23.

The seal members according to the present invention can be circular or square in structure, without limitation on their shape.

(3) The motor is separated from the harmonic reducer and control board via the housing into different spaces. The motor includes a motor stator 6 and a motor rotor 8. The motor rotor 8 is connected to the motor shaft 2 using a flat key 9, and is axially positioned at both ends by means of a shaft shoulder 37 and a spacer ring 26. This connection facilitates disassembly and assembly, and ensures reliability during installation. The motor stator 6 is fixed to the housing A7, with no restriction on the connection manner. The left end of the motor rotor 8 is positioned by the shaft shoulder 37 of the motor shaft 2 one the side close to the harmonic reducer, while the right end of the motor rotor 8 is axially positioned by the spacer ring 26 one the side away from the harmonic reducer. The side of the flat key 9 has a transitional fit with a mounting slot 38 of the motor shaft 2 and a mounting slot 39 of the rotor.

(4) In the present invention, the wave generator 3 is mechanically fixed to the motor shaft 2, which in turn is mechanically fixed to the motor rotor 8, resulting in a coaxial connection between the wave generator 3 and the motor rotor 8.

(5) In the present invention, a magnetic shielding plate 10 is provided. During operation of the motor, a certain amount of electromagnetic interference will be generated. To prevent the motor from interfering with the communication of the control board 14 on right side, two measures are used in the present invention. One is to provide a magnetic shielding plate 10 between the motor and the control board 14, where the magnetic shielding plate 10 is mechanically fixed to the housing B 11. The other is that the motor shaft 2 is made of non-magnetic aluminum alloy material. These two solutions can greatly reduce the electromagnetic interference of the motor on the control board 14. Among them, the housing A7 and the housing B11 refer to different parts on the housing, which have been numbered for ease of description.

(6) In the present invention, magnetic coders are utilized, which, compared to optical coders that are predominantly employed at present, feature higher rotational speed, enhanced usability, superior resistance to shock, rapid response time, and are particularly suitable for scenarios with confined spaces. The magnetic coder is fixed to the control board 14 by means of electrical connection. In the present invention, there are two magnetic coders: one is coder sensor plate A12, and the other is coder sensor plate B15. Magnetic disk 13 corresponding to the coder sensor plate A12 is fixed to the motor shaft 2 with a coaxial connection. Magnetic ring 16 corresponding to the coder sensor plate B15 is fixed to shaft of the output end 1, also with a coaxial connection. The coder sensor plate A12 is configured to detect a speed of input end of the motor, and the coder sensor plate B15 is configured to detect a speed of the output end.

(7) In the present application, the control board 14 is mechanically fixed to the housing B11. The control board 14 features a hollow structure, and the output end 1 also features a hollow structure, allowing cables to pass therethrough. This structural design contributes to a more compact overall configuration of the joint unit.

To prevent interference of reducer grease on the control board 14, surface of the control board 14 can be coated with protective glue according to one embodiment of the invention.

(8) In the present invention, the motor shaft 2 is coaxially connected to the housing A7 through the bearing A17 and the bearing C20. The reducer is separated from the motor via the housing A7 and the bearing C20. Given that the reducer is filled with lubricating grease, to prevent the grease from entering interior of the motor, a sliding seal member 24 is provided in a gap between the housing A7, which is located between the reducer and the motor, and the motor shaft 2. The sliding seal member 24 comprises two parts of sealing plastic 24.1 and O-ring 24.2. To prevent dynamic wear and compression damage of O-ring 24.2, the O-ring 24.2 is in contact with the stationary housing A7. The sealing plastic 24.1 is in contact with surface of the motor shaft 2, and is axially positioned on both sides by a retaining ring A25 and a retaining ring B27. The sealing plastic 24.1 is made of wear-resistant TFE (tetrafluoroethylene) material, and the O-ring 24.2 is made of oil-resistant nitrile rubber, which can effectively enhance sealing performance.

(9) In the present invention, to enhance stability of rotation of motor shaft 2 and add bearing support to the motor shaft 2, bearings B18 and D21 are provided between left and right ends of the motor shaft 2 and the output end 1. The inner ring 35 of the bearing D21 is fixed to the output end 1, while the outer ring 36 is fixed to internal mounting surface 3.1 of the wave generator 3 and the internal recessed surface A2.1 of the motor shaft 2, and the radial dimension of the recessed surface A2.1 is significantly greater than that of the shaft hole surface 2.2 of the motor shaft, enabling the inner ring 35 of the bearing D21 to be virtually aligned with the shaft hole surface 2.2, whereas in existing conventional designs, the outer ring 36 of the bearing D21 could potentially align with the shaft hole surface 2.2. In comparison, the design according to the present invention reduces the radial dimension of the entire joint. The inner ring 35 of the bearing B18 is fixed to the output end 1, while the outer ring 36 is fixed to the recessed surface B2.3 of the motor shaft 2. The radial dimension of recessed surface B2.3 is considerably larger than that of bore surface 2.2, ensuring that the installation of bearing B18 does not increase the radial dimension of the entire joint, thus contributing to a more compact structure. The motor shaft 2 can rotate freely around the output end 1. The bearings B18 and D21 also serve to prevent the lubricating grease of the harmonic reducer from seeping into the control board 14 on right side through the space between the motor shaft 2 and the output end 1. Preferably, in one embodiment of the present invention, the bearings B and D are selected as deep groove ball bearings with seal members on both sides.

In the present invention, the motor shaft is provided with four support points designated as bearings A, B, C, and D. The bearings A and C are located at the midpoint of the motor shaft, and the bearings B and D are located at two ends. The multiple support points can effectively enhance stability of the rotating shaft.

(10) In the present invention, the cover plate 19 is mechanically fixed to the housing B11 to prevent dust and impurities from entering the electrical components. The cover plate 19 is made of aluminum material with better heat dissipation effect.

Figure 2:
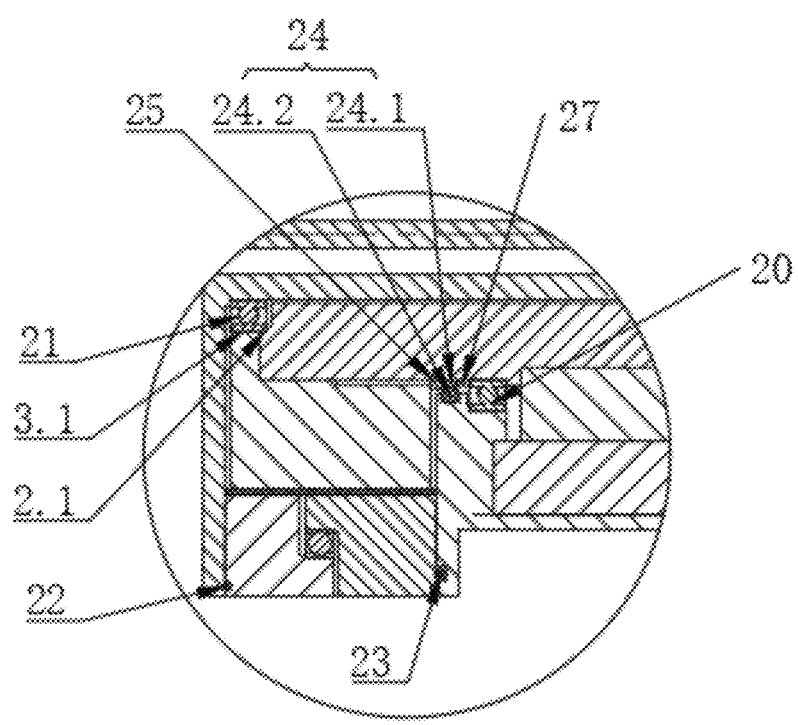
FIG. 2 is an enlarged view of area A inside the robotic arm joint according to the present invention.
Figure 3:
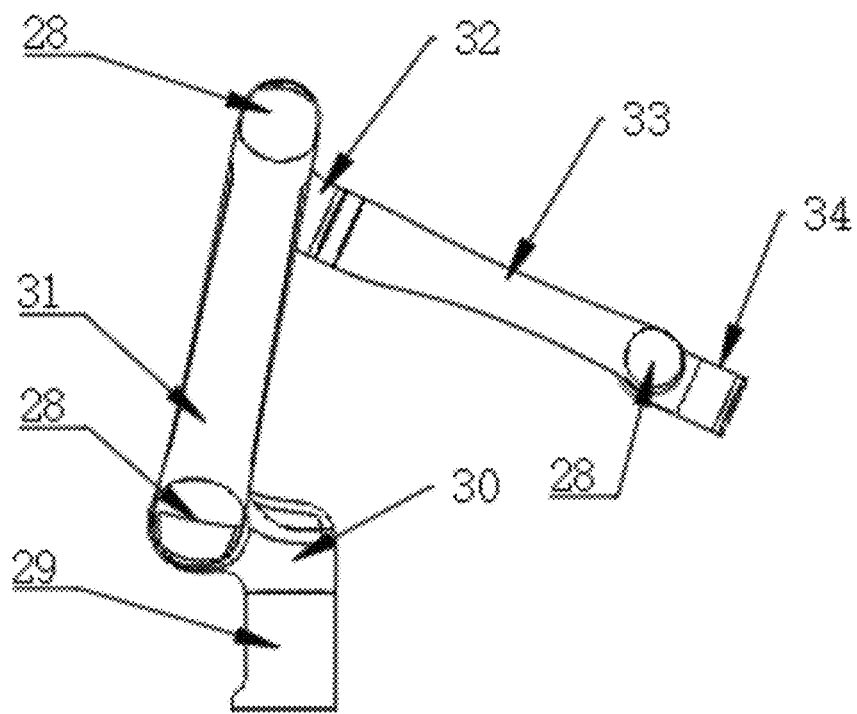
FIG. 3 is a schematic diagram of a structure of a robot according to the present invention.

As shown in FIG. 2, a robot according to one embodiment of the present invention comprises robotic arm s A29, B30, C31, D32, E33, F34 and respective joint units 28. The robotic arms are connected to each other via joint units 28 or connecting members. The terminal robotic arm F33 can be fixed to a load, enabling movement or rotation of the load. Each joint unit 28 in the robotic arms has functions of the aforementioned robot joint units, which will be omitted here.

Through the above description, a small-scale robotic arm joint and a robot thereof are provided. It should be understood that the implementations described in the above embodiments do not represent all implementations consistent with this application. Various modifications or variations that can be made by those skilled in the art without requiring creative labor based on the technical solutions of the present invention still fall within the protection scope of the present invention.

Except for the technical features mentioned in the specification, all others are known technologies to those skilled in the art. In this disclosure, descriptions of well-established components and conventional technologies have been omitted to avoid redundancy and to prevent any unnecessary restriction of the scope of the present invention.

What is claimed is:

1. A small-scale robotic arm joint, comprising:
   a motor, a harmonic reducer, and a control board separated by a first housing and a second housing into different spaces;
   a motor shaft coaxially connected to the first housing via a first bearing and a second bearing;
   the harmonic reducer separated from the motor via the first housing and the second bearing, and a sliding seal member provided in a gap between the first housing and the motor shaft separated from each other;
   the sliding seal member including a sealing plastic and an O-ring, wherein the O-ring is in contact with the first housing, and the sealing plastic is in contact with a surface of the motor shaft;
   retaining rings mounted on both sides of the sealing plastic for axial positioning;
   a third bearing and a fourth bearing provided between both ends of the motor shaft and the output end, wherein inner rings of the third bearing and the fourth bearing are fixed to the output end, and outer rings of the third bearing and the fourth bearing are fixed to a first recessed surface and a second recessed surface of the motor shaft respectively, and wherein a radial dimension of the first recessed surface and a radial dimension of the second recessed surface are greater than that of shaft hole surface of the motor shaft, allowing the inner rings of the third bearing and the fourth bearing to be substantially aligned with the shaft hole surface of the motor shaft;

a circular spline of the harmonic reducer, wherein the circular spline is mechanically fixed to the output end, with an outer diameter of the circular spline being a maximum outer diameter of a joint unit;

seal members fitted on contact surfaces between the circular spline and the output end, as well as between the circular spline and the first housing;

a rotor of the motor, the rotor being connected to the motor shaft via a flat key;

a stator of the motor, the stator being fixed to the first housing;

a left end of the rotor positioned by a shaft shoulder of the motor shaft on a side close to the harmonic reducer, and a right end of the rotor positioned axially by a spacer ring;

the control board mechanically fixed to the second housing, and both the control board and the output end having a hollow structure through which cables pass; and the control board fixed with two magnetic coders via electrical connection, wherein a magnetic disk corresponding to a first coder sensor plate is fixed to the motor shaft, while a magnetic ring corresponding to a second coder sensor plate is fixed to the shaft of the output end.

2. The robotic arm joint according to claim 1, wherein two wiring holes are formed in a shaft of the output end, through which power cables and signal cables of the joint unit are respectively threaded through one of the wiring holes.

3. The robotic arm joint according to claim 1 wherein a side of the flat key is in a transitional fit with both a mounting slot of the motor shaft and a mounting slot of the rotor.

4. The robotic arm joint according to claim 1 wherein a magnetic shielding plate is provided on the second housing separating the motor from the control board.

5. The robotic arm joint according to claim 4, wherein the motor shaft is made of non-magnetic aluminum alloy.

6. The robotic arm joint according to claim 4, wherein a surface of the control board is coated with protective adhesive.

7. The robotic arm joint according to claim 1, wherein the third bearing and the fourth bearing are deep groove ball bearings with double-sided seal rings.

8. The robotic arm joint according to claim 1, wherein the second housing is mechanically fixed to a cover plate.

9. A robot including the robotic arm joint according to claim 1 for connection between robotic arms.

\* \* \* \* \*